(12) United States Patent
Skoog et al.

(10) Patent No.: US 7,250,192 B2
(45) Date of Patent: *Jul. 31, 2007

(54) SPRAYABLE NOBLE METAL COATING FOR HIGH TEMPERATURE USE DIRECTLY ON AIRCRAFT ENGINE ALLOYS

(75) Inventors: Andrew Jay Skoog, West Chester, OH (US); Jane Ann Murphy, Franklin, OH (US); Bryan Thomas Bojanowski, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/726,361

(22) Filed: Dec. 3, 2003

(65) Prior Publication Data

US 2004/0228977 A1    Nov. 18, 2004

Related U.S. Application Data

(63) Continuation-in-part of application No. 10/131,518, filed on Apr. 23, 2002, now Pat. No. 6,720,034.

(51) Int. Cl.
B05D 3/02 (2006.01)
B05D 5/00 (2006.01)
B05D 3/00 (2006.01)
B41M 5/00 (2006.01)

(52) U.S. Cl. .................. 427/383.7; 427/383.1; 427/421.1; 427/147; 427/191

(58) Field of Classification Search ........... 427/213.13, 427/455, 421.1, 452, 453, 45; 29/888.02
See application file for complete search history.

(56) References Cited

U.S. PATENT DOCUMENTS 3,787,223 A    1/1974    Reedy, Jr.
3,972,475 A    8/1976    Nelson et al.

(Continued)

FOREIGN PATENT DOCUMENTS

GB    206436 A * 5/1981

(Continued)

OTHER PUBLICATIONS

Eppler, Richard A. "Ceramic Coatings" Engineered Materials Handbook. vol. 4. Ceramics and Glasses. ASM International. 1991. pp. 953-956.*

(Continued)

Primary Examiner—Timothy Meeks
Assistant Examiner—David Turocy
(74) Attorney, Agent, or Firm—McNees Wallace & Nurick LLC

(57) ABSTRACT

A method of applying a heat-rejection coating directly on a substrate of a metallic component is disclosed. The steps include supplying a metallic component, such as of a gas turbine engine, before applying a reflective-coating mixture onto the component, wherein the reflective-coating mixture comprises a metallic pigment and a reflective-coating-mixture carrier, and wherein the step of applying is accomplished by a method selected from the group consisting of air-assisted spraying, airless spraying, brushing, and decal transfer. The component having the reflective-coating mixture thereon is fired to form a reflective coating on the component.

23 Claims, 9 Drawing Sheets

U.S. PATENT DOCUMENTS

| | | | |
|---|---|---|---|
| 4,023,249 A | | 5/1977 | Darrow et al. |
| 4,137,370 A | | 1/1979 | Fujishiro et al. |
| 4,145,481 A | | 3/1979 | Gupta et al. |
| 4,163,736 A | | 8/1979 | Acres et al. |
| 4,181,757 A | | 1/1980 | Youdelis |
| 4,305,998 A | | 12/1981 | Manty et al. |
| RE31,339 E | | 8/1983 | Dardi et al. |
| 4,399,199 A | | 8/1983 | McGill et al. |
| 4,433,005 A | | 2/1984 | Manty et al. |
| 4,552,784 A | | 11/1985 | Chu et al. |
| 4,676,994 A | | 6/1987 | Demaray |
| 4,877,647 A | * | 10/1989 | Klabunde .................. 427/123 |
| 4,902,535 A | | 2/1990 | Garg et al. |
| 4,997,686 A | | 3/1991 | Feldstein et al. |
| 5,167,869 A | | 12/1992 | Nebe et al. |
| 5,407,705 A | | 4/1995 | Vakil |
| 5,545,437 A | * | 8/1996 | Nagaraj et al. ............. 427/404 |
| 5,584,173 A | | 12/1996 | Lybarger |
| 5,660,320 A | | 8/1997 | Hoffmuller et al. |
| 5,753,317 A | * | 5/1998 | Law et al. .................. 427/487 |
| 5,851,679 A | | 12/1998 | Stowell et al. |
| 5,885,716 A | | 3/1999 | Nagasawa et al. |
| 5,922,403 A | * | 7/1999 | Tecle .......................... 427/212 |
| 6,007,919 A | | 12/1999 | Skoog et al. |
| 6,177,186 B1 | | 1/2001 | Skoog et al. |
| 6,210,791 B1 | * | 4/2001 | Skoog et al. ............... 428/325 |
| 6,455,167 B1 | * | 9/2002 | Rigney et al. ........... 428/472.2 |
| 6,720,034 B2 | * | 4/2004 | Skoog et al. ............ 427/419.1 |

FOREIGN PATENT DOCUMENTS

JP  60081892 A * 5/1985

OTHER PUBLICATIONS

Kirk-Othmer. Encyclopedia of Chemical Technology. Fourth Edition. vol. 22. page 670-690.*

Engelhard Corp., Material Safety Data Sheet for Liquid Metal A4841, 8 pages, Mar. 31, 2001.

Engelhard Corp., Material Safety Data Sheet for Spray Platinum for Ceramics APP101A, 8 pages, Aug. 1, 2000.

Engelhard Corp., Material Safety Data Sheet for Liquid Bright Gold for Spraying 991BD, 7 pages, Dec. 13, 1999.

* cited by examiner

FIG. 10  AS RECEIVED R41 + TOP COAT + BARRIER COAT IN FIRED CONDITION

SPRAYABLE NOBLE METAL COATING FOR HIGH TEMPERATURE USE DIRECTLY ON AIRCRAFT ENGINE ALLOYS

CROSS-REFERENCE TO RELATED APPLICATIONS

This Application is a continuation-in-part of application Ser. No. 10/131,518, filed Apr. 23, 2002, now U.S. Pat. 6,720,034, and is related to application Ser. No. 10/726,361, filed contemporaneously with this Application on Dec. 3, 2003. entitled "SPRAYABLE NOBLE METAL. COATING FOR HIGH TEMPERATURE USE DIRECTLY ON AIRCRAFT ENGINE ALLOYS" assigned to the assignee of the present invention and which is incorporated herein by reference.

FIELD OF THE INVENTION

This invention relates to the coating of articles and, more particularly, to an economical, effective approach for coating aircraft gas turbine parts to reject heat and thereby reduce thermal fatigue failures to help meet life objectives without using additional cooling air.

BACKGROUND OF THE INVENTION

A continuing trend is to increase the operating temperature of the gas turbine engine, as higher temperatures lead to greater thermodynamic efficiency. The ability of the engine to operate at ever-higher temperatures is limited by the materials used in the engine. A variety of techniques are used to achieve increased operating temperatures of the metals used, specifically, superalloys and titanium. Improved materials with inherently higher operating temperatures are developed. New processing techniques, such as directional solidification and improved heat treatments are utilized. Bleed-air cooling by air directed from the compressor to the hot sections of the engine is widely used.

Coatings are also important contributors to the increased temperature capability of modern gas turbine engines. Environmental coatings inhibit corrosive damage to the coated articles, allowing them to operate in environments, such as the high-temperature corrosive combustion gas, for which they would otherwise be unsuited. Ceramic thermal barrier coatings serve as insulation layers and are usually overlying environmental coatings that serve as bond coats, such as MCrAlYs.

Another type of coating is a layer of an optically reflective material that reflects a portion of the incident radiative heat loading away from the coated article. This type of heat-reflective and heat-rejection coating may be made of a metal or a ceramic adhered to the surface of the protected article. The drawbacks of these coatings are that they are relatively expensive to apply and may adversely affect the properties of the underlying substrate article upon which they are deposited. Additionally, it is difficult to apply the coatings to large articles due to processing equipment requirements and limitations.

There is a need for an approach to applying heat-reflective coatings that may be readily and inexpensively utilized both for newly made and repaired/refurbished articles, and which does not adversely affect the underlying substrate articles upon which the coatings are applied. The present invention fulfills this need, and further provides related advantages.

BRIEF SUMMARY OF THE INVENTION

The present invention provides a heat-rejection coating that is readily and inexpensively applied to a metallic substrate article such as a superalloy article. The heat-rejection coating aids in preventing heating of the article by reflecting incident radiant energy. The present approach is readily utilized with large articles that do not fit into the deposition chambers required for prior approaches.

A method of applying a heat-rejection coating comprises the steps of supplying a metallic component of a gas turbine engine, spraying a reflective-coating mixture onto the component, the reflective-coating mixture comprising a metallic pigment and a carrier, and firing the component having the reflective-coating mixture thereon to form a reflective coating on the component.

The component to which the reflective coating is applied is most preferably made of a nickel-base superalloy. Examples of components to which the coating may be applied include, but are not limited to, an exhaust nozzle convergent flap, an exhaust nozzle convergent seal, and parts that experience radiation in the combustion and exhaust systems.

The reflective-coating mixture desirably includes the metallic pigment in the form of finely divided particles and/or metal salts which precipitate atomic size metal particles of a metal such as platinum, gold, palladium, silver, rhodium or alloys of these metals such as platinum-rhodium alloys. The carrier is an evaporable liquid that allows the metallic pigment to flow through the spray system and then aids in initially adhering the metallic pigment to the surface of the component prior to firing. Organic carriers are preferred.

The reflective coating is quite thin, both to conserve the expensive metal and to avoid a coating that adversely affects the properties of the underlying component. Because the reflective coating is thin, it is preferred to specify its quantity by areal weight rather than by thickness. Most preferably, the reflective coating is present in an amount of from about 0.00275 to about 0.00475 grams per square inch of the component surface being coated.

Preferably, the component surface is pre-treated prior to the application of the reflective-coating mixture, so that the reflective-coating mixture is sprayed onto the pre-treated surface. Pre-treatments include one or more of (a) polishing the component surface, (b) pre-oxidizing the component surface, (c) vapor depositing an oxide barrier coating, and (d) applying a ceramic barrier coating onto the component surface and thereafter drying the ceramic barrier coating. Most preferably, pre-treatments (a), (b), and (d) are used together, in the indicated order.

The ceramic barrier coating, where used, is preferably applied by air-assisted spraying a ceramic-barrier-coating mixture onto the surface of the component, although airless and high volume low pressure (HVLP) methods have also been demonstrated, and then drying the ceramic-barrier-coating mixture to form the ceramic barrier coating. Additionally, brushing and decal transfer methods may also be used. The ceramic barrier coating is preferably supplied as the ceramic-barrier-coating mixture of particles of a ceramic material such as lanthanum and cerium, dispersed in a ceramic-barrier coating carrier such as an organic liquid. The ceramic barrier coating, where used, is desirably thin. The reflective coating and the ceramic barrier coating are preferably together present in an amount of from about 0.00325 to about 0.00625 grams per square inch of the component surface being coated.

The reflective coating, similar to the ceramic coating, is preferably applied by air-assisted spraying, although airless, HVLP, brushing and decal transfer methods have been demonstrated. Air-assisted spraying is a technique comparable to the familiar spraying of ordinary paint, and is typically performed at room temperature using an air-spray-gun type device. The material to be sprayed, here the reflective coating and possibly the ceramic barrier coating, are not significantly heated during the spray process (although they are heated subsequently in the firing step). Airless and air-assisted spraying are to be contrasted with other spray techniques used to deposit other types of coatings in the gas turbine industry, such as vacuum plasma spraying and air plasma spraying, which are not within the scope of the invention. Plasma spray techniques are performed by heating the material to be sprayed to high temperatures and then forcing the heated material against the surface with a flow of the spray gas. Air-assisted spraying is also to be contrasted with other types of deposition techniques such as chemical vapor deposition (CVD), physical vapor deposition (PVD), and electrodeposition, all of which require complex deposition apparatus, and all of which are not within the scope of the invention. Most of these other application techniques are limited as to the size of the articles that may be readily coated, because they require special chambers or other types of application apparatus. Airless or air-assisted spraying, which are typically an ambient temperature process, on the other hand, is not limited by these considerations, and therefore may be readily used on a wide variety of sizes and shapes of components.

The present approach may be used to deposit an alloyed metallic coating, as distinct from a pure metallic coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
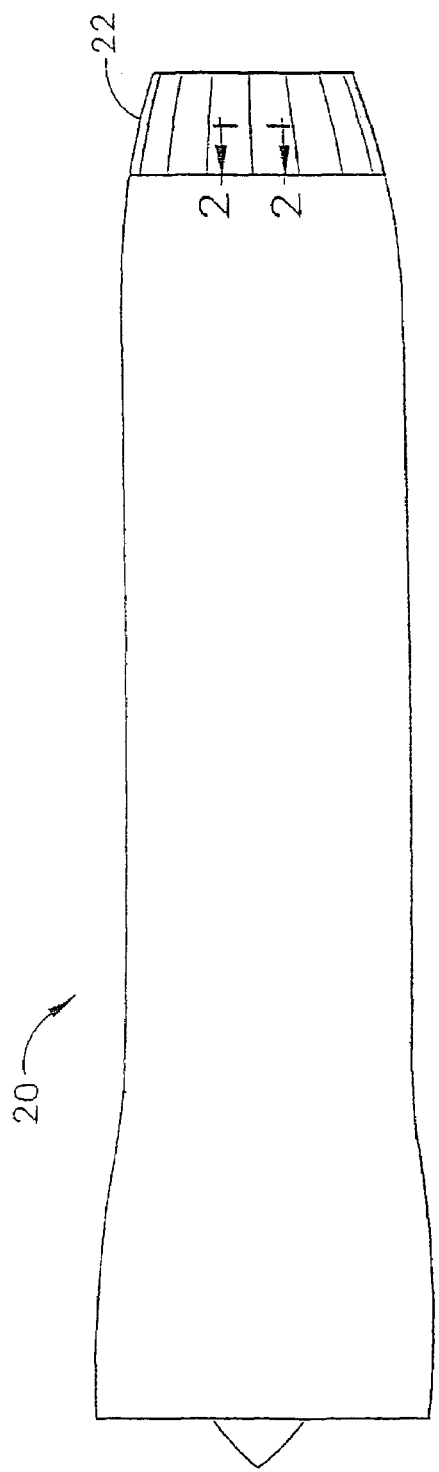
FIG. 1 is an elevational view of a gas turbine engine.
Figure 2:
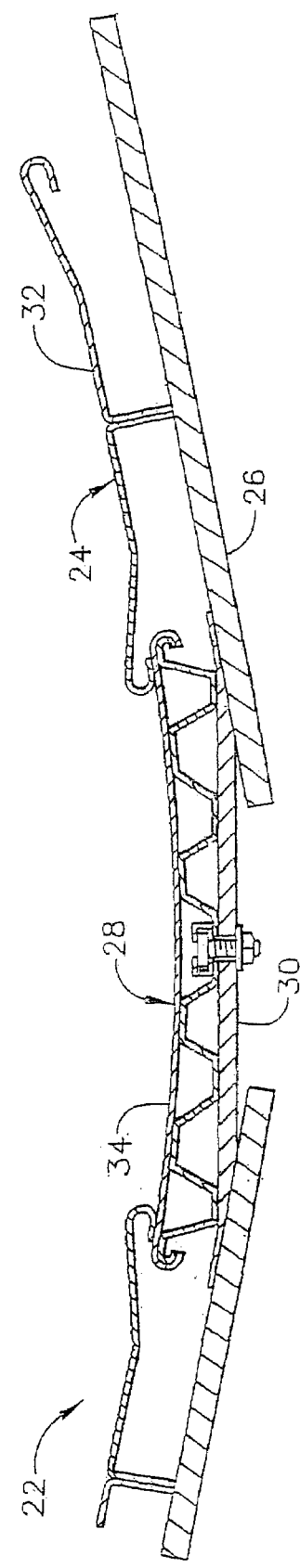
FIG. 2 is an enlarged schematic sectional view of the gas turbine engine of FIG. 1, showing a variable-geometry-exhaust-nozzle flap and seal assembly.

FIG. 1 is an elevational view of a gas turbine engine 20 with a variable-geometry exhaust nozzle 22, a portion of which is shown in greater detail in the sectional view of FIG. 2. The exhaust nozzle 22 includes an exhaust nozzle convergent flap 24 and its support 26, and an exhaust nozzle convergent seal 28 and its support 30. This structure extends around the entire circumference of the exhaust nozzle 22. The exhaust nozzle convergent flaps 24 are pivoted inwardly and outwardly to controllably alter the area of the exhaust nozzle, and the exhaust nozzle convergent seals 28 prevent combustion gas leakage between the exhaust nozzle flaps 24. Variable-geometry exhaust nozzle 22 structures of this and other types are known in the art, and FIGS. 1-2 illustrate only the elements of the structure pertinent to one application of the present invention.

The exhaust nozzle convergent flaps 24 and exhaust nozzle convergent seals 28 are heated by the contact of the hot combustion gas flowing through the variable-geometry exhaust nozzle 22, when they are pivoted inwardly to reduce the area of the exhaust nozzle. In a typical case, the inwardly facing surfaces of the exhaust nozzle convergent flaps 24 and the exhaust nozzle convergent seals 28 frequently reach temperatures as high as 1,600° F., absent the heat-rejection coating of the present invention. The present approach provides a technique for coating these elements on their inwardly facing surfaces 32 and 34, respectively, with a heat rejection coating that reduces the temperature reached by as much as 300° F.

Figure 3:
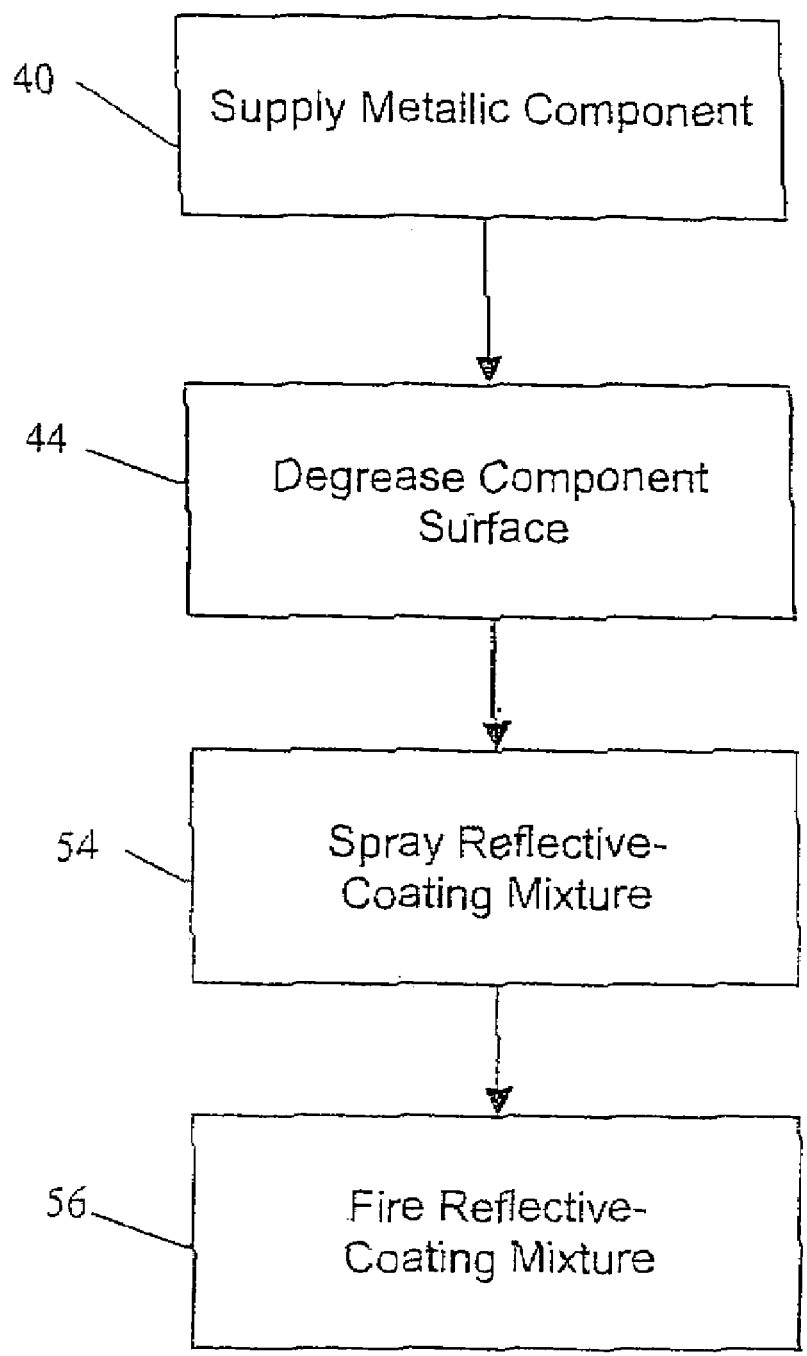
FIG. 3 is a block flow diagram of a preferred approach for practicing the invention.
Figure 4:
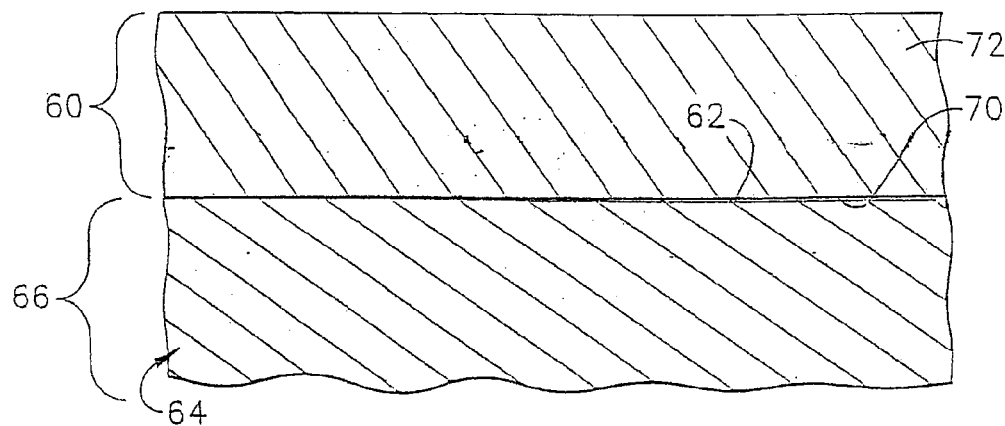
FIG. 4 is a schematic sectional view of a coated component by the approach of FIG. 3.

FIG. 3 depicts a preferred approach for applying a heat-rejection coating, and FIG. 4 (which is not drawn to scale) shows such a heat-rejection coating 60 deposited on a surface 62 of a metallic component 64, which serves as a substrate 66 for the heat-rejection coating 60. The metallic component 64 is supplied, numeral 40. The metallic component 64 is preferably a component of a gas turbine engine, such as the exhaust nozzle convergent flap 24 or the exhaust nozzle convergent seal 28. The metallic component 64 is preferably made of a nickel-base superalloy, a cobalt-base alloy or a titanium alloy. A nickel-base alloy is one having nickel present in a greater percentage by weight than any other element. A nickel-base superalloy is a nickel-base alloy that is strengthened by the precipitation of gamma prime phase or a related phase. Nickel-base superalloys are known in the art. A preferred nickel-base superalloy is Rene 41®, which is a registered trademark of General Electric Company of Schenectady, N.Y., having a nominal composition in weight percent of from about 18 to about 20 percent chromium, from about 9 to about 10.5 percent molybdenum, from about 10 to about 12 percent cobalt, from about 1.4 to about 1.8 percent aluminum, from about 3 to about 3.3 percent titanium, about 5 percent maximum iron, balance nickel, minor elements, and impurities. A cobalt-base alloy is one having cobalt present in a greater percentage by weight than any other element. A preferred cobalt-base alloy is HS188, whose nominal composition, in weight percent is 22 percent nickel, 41.5 percent cobalt, 22 percent chromium, 14 percent tungsten, 0.1 percent carbon, 0.35 percent silicon, 0.1 percent lanthanum, balance minor amounts of other elements. A titanium alloy is one having titanium present in a greater percentage by weight than any other element.

Preferred titanium alloys include Ti64 whose nominal composition in weight percent is 6 percent aluminum, 4 percent vanadium, balance titanium and Ti6242 whose nominal composition in weight percent is 6 percent aluminum, 2 percent molybdenum, 4 percent zirconium, 2 percent tin, balance titanium. The present approach may be used with other components and other alloys than those set forth above.

The component surface 62 of the component 64 optionally, but preferably, receives a degreasing pre-treatment, numeral 42, to form a pre-treated component surface. This degreasing pre-treatment removes any materials that may be present from previous processing of the component 64, and is typically achieved by polishing the component surface. The polishing is preferably accomplished using an air grinder with a commercially available Scotch Brite® pad, which is a registered trademark of Minnesota Mining and Manufacturing Company of St. Paul, Minn. This polishing removes any pre-existing grease, soot, and oxide scale and desirably produces a surface Ra value of less than about 15. Even when the component surface 62 is degreased, which is a relatively inexpensive step to perform, one of the significant advantages of this embodiment of the present invention is that additional pre-treatments of the component surface 62, which add expense, are not required if the component is not subjected to temperatures exceeding about 1,400° F. That is, for components that are not exposed to operating temperatures which exceed about 1,400° F., it is neither necessary to pre-oxidize the component surface, which involves a heat treatment step, and/or to add a ceramic barrier coating to the component.

Once the component has been degreased or polished 44, a reflective-coating mixture is thereafter directly air sprayed, numeral 54, onto the component surface 62. The reflective-coating mixture comprises fine particles of a metallic pigment, such as platinum, gold, palladium, and alloys thereof, mixed with an organic reflective-coating-mixture carrier. A platinum/gold blend is preferred as the metallic pigment. A suitable platinum-containing reflective-coating mixture is Engelhard Spray Bright Platinum APP100A, available from Engelhard Corporation, East Newark, N.J. The APP100A comprises about 1-30 percent by weight metallo-organic platinum compounds, with the remainder being organic compounds. A suitable gold-containing reflective coating mixture is Liquid Bright Gold for Spraying 991BD, available from Engelhard Corporation, East Newark, N.J. The 991BD material comprises about 1-10 percent by weight (total) of platinum and gold compounds, with the remainder being organic compounds. Preferably, the reflective coating mixture is a blend of about 25 percent by weight Bright Platinum APP100A with the remaining portion being Bright Gold 991BD.

Each of the reflective coating formulations advantageously encapsulates the noble metal contained within the formulation, which encapsulation is believed to prevent stress corrosion cracking when the metal coated part is exposed to salts at temperature. This is especially critical for titanium alloys. Additionally, the reflective coating formulations contain fluxes and glass formers, as well as the encapsulated noble metal, which each contribute to prevent the reflective coating from diffusing into the substrate of the component at high temperatures.

Figure 5:
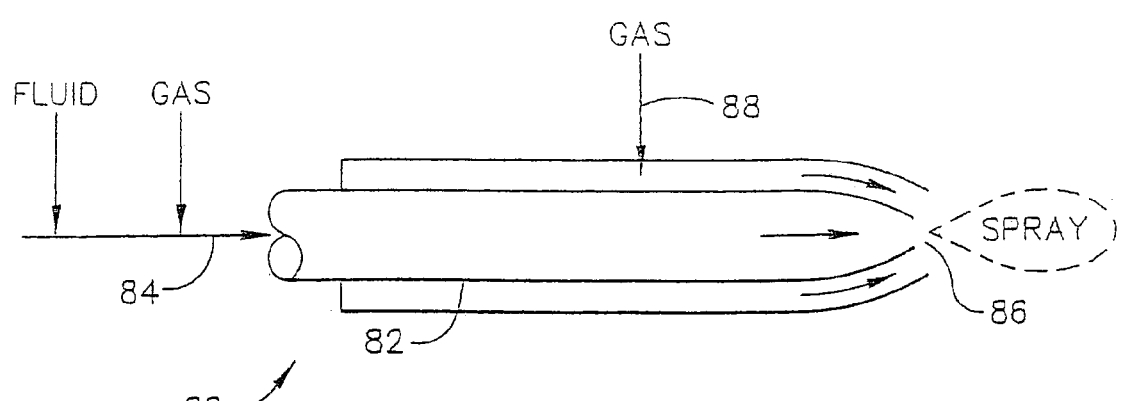
FIG. 5 is a schematic sectional view of an air-spray apparatus.

The air-assisted spraying 54 is accomplished with an air-spray apparatus 80, such as that depicted schematically in FIG. 5. The air-spray apparatus 80 includes a hollow tube 82 into which a flow 84 of the fluid mixture to be air sprayed is introduced under pressure. The flow 84 expands through an expansion nozzle 86 and vaporizes to form a mist of the air-sprayed material. The mist is actually formed from the vaporized organic carrier, and the solid particles of the noble metal/ceramic material are carried with the flow of the mist to the surface being air sprayed. Additional gas or fluid may be introduced through an assist line 88 to shape the flow exiting the nozzle 86.

The air-spraying is performed in ambient conditions, that is, in air, without heating either the flow of the mixture being sprayed or the substrate. It is readily performed quickly and inexpensively on components 64 of any size, using the easily operated apparatus 80. Air-assisted spraying is contrasted with other types of deposition techniques often used to deposit coatings on gas turbine components, such as plasma spraying, vapor phase aluminiding, and chemical vapor deposition, all of which are performed at elevated temperatures and in most cases in special atmospheric chambers or devices. Air-assisted spraying is also contrasted with electrodeposition and dipping techniques, which require that the article be immersed in a liquid medium. Alternative approaches which are within the scope of the present invention are HVLP airless spraying, brushing, and decal transfer application.

It is preferred that the air-assisted spraying 54 applies the reflective-coating mixture in several layers, allowing each layer to air dry before the next layer is applied.

The component 64 having the reflective-coating mixture thereon is thereafter fired to form a reflective coating 72, numeral 56. The firing 56 is performed by heating the reflective-coating mixture to an elevated temperature in air. A preferred temperature range is from about 1,100° F. to about 2,150° F., and a most-preferred firing 56 is at about 1,400° F. for about one hour. The preferred approach is to heat the entire component 64 and the applied coating 72 to the firing temperature.

The reflective coating 72 is applied in an amount such that the total amount of the reflective coating 72 is present in an amount of from about 0.00275 to about 0.00475 grams per square inch of the component surface 62 to which it is applied after the article as been fired at about 1,400° F. for about 1 hour.

Figure 6:
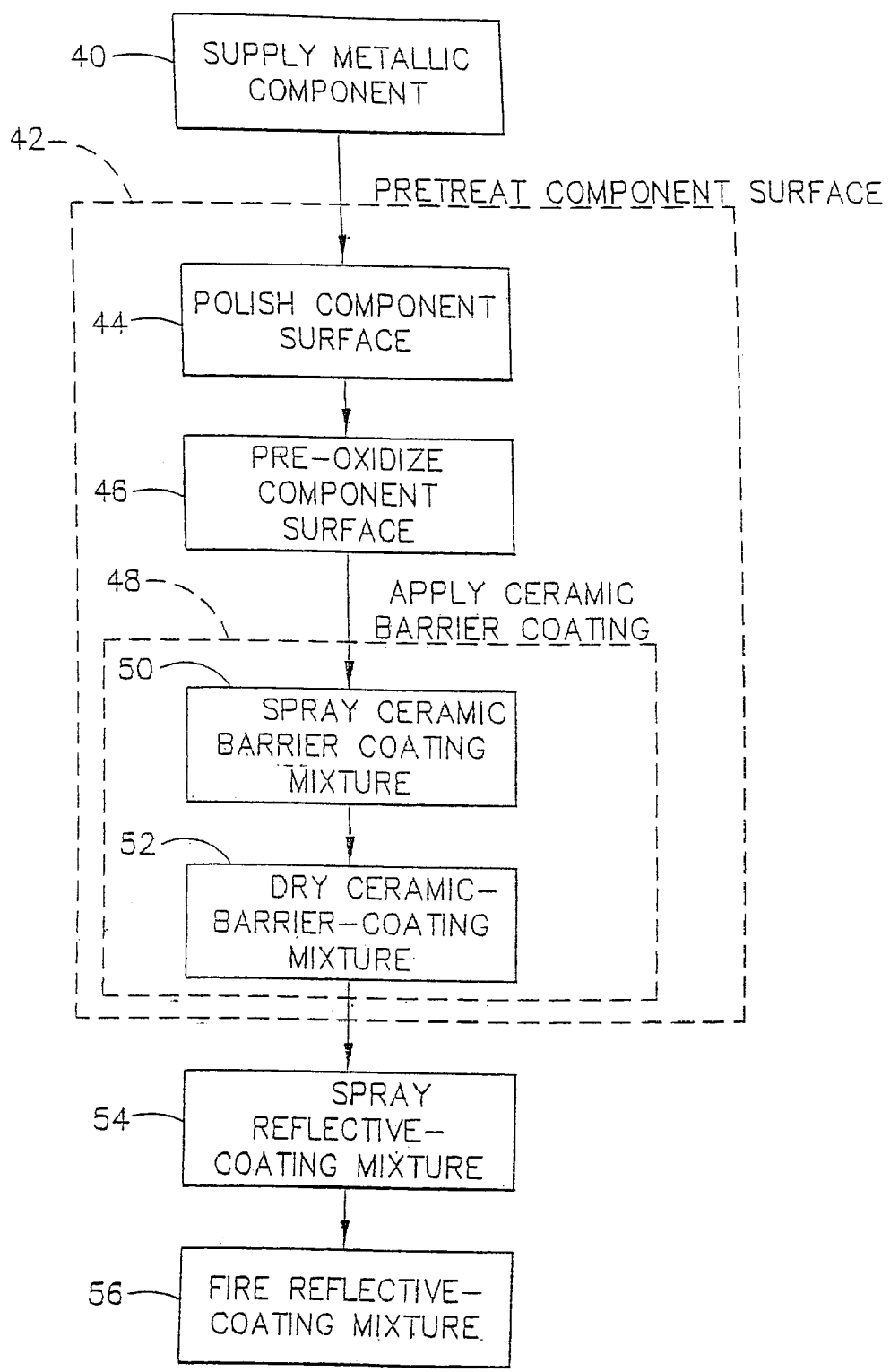
FIG. 6 is a block flow diagram of an additional approach for practicing the invention.
Figure 7:
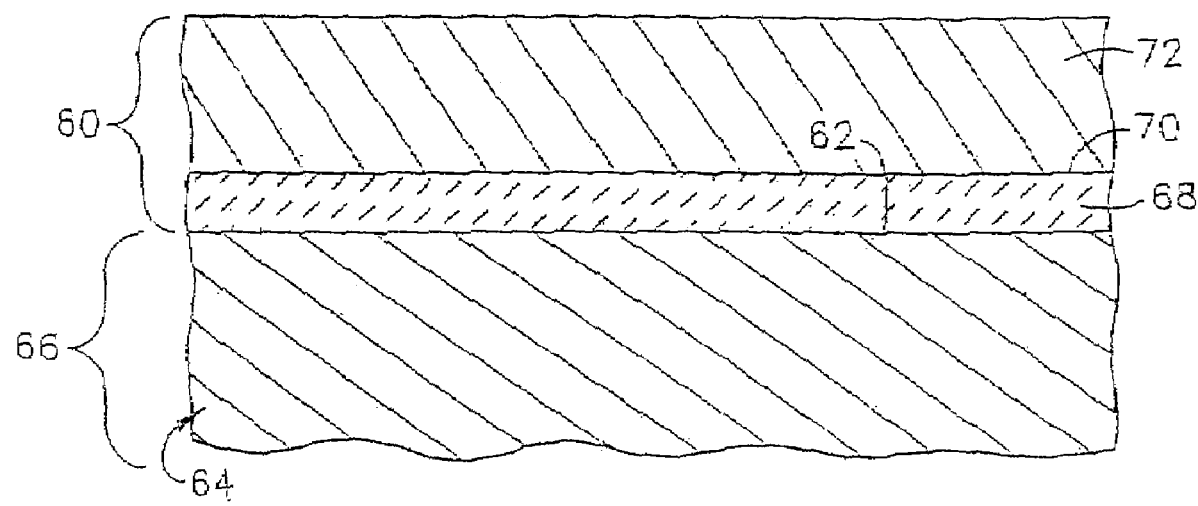
FIG. 7 is a schematic sectional view of a coated component by the approach of FIG. 6.

However, if the component is subjected to temperature between about 1,400° F. to about 1,650° F., and even reaching about 1,800° F. for short periods of time, an alternate coating and approach to applying the coating to the component is presented. FIG. 6 depicts an alternate approach for applying a heat-rejection coating, and FIG. 7 (which is not drawn to scale) shows such a heat-rejection coating 60 deposited on a surface 62 of a metallic component 64, which serves as a substrate 66 for the heat-rejection coating 60.

Once the component 64 is supplied, numeral 40, the component surface 62 of the component 64 is optionally but preferably pre-treated, numeral 42, to form a pre-treated component surface. There are three types of pre-treatments that are of primary interest, and they may be used independently or together in any operable combination. The following discussion will address all three pre-treatments used in the order indicated in FIG. 6, the most preferred pre-treatment approach.

In the first pre-treatment, as previously discussed in FIG. 3, the component surface 62 is polished, numeral 44, to remove any materials that may be present from previous processing of the component 64.

In a second pre-treatment, the component surface 62 is pre-oxidized, numeral 46. The pre-oxidation 46 produces a uniform oxide coating on the component surface 62, suitable for adhesion with the subsequent coating layers. A preferred pre-oxidation 46 is at a temperature of from about 1,100° F. to about 2,150° F., most preferably at 1,400° F. for about 16 hours.

In a third pre-treatment, a ceramic barrier coating 68 is applied to the component surface 62, numeral 48. The application 48 of the ceramic barrier coating 68 may be accomplished by any operable technique. The application is preferably performed by airless or air-assisted spraying, numeral 50, of a ceramic-barrier-coating mixture onto the component surface 62. The ceramic-barrier-coating mixture preferably includes fine particles of a ceramic material such as lanthanum and cerium, dispersed in an organic carrier material. (As used herein, "ceramic material" includes both materials that are initially a ceramic, and materials that are ceramic precursors and become ceramics during subsequent processing.) A suitable commercially available material that may be used as the ceramic-barrier-coating mixture is Engelhard Liquid Metal A4841, available from Engelhard Corporation, East Newark, N.J. The Liquid Metal A4841 comprises about 1-5 percent by weight rare earth compounds, preferably lanthanum and/or cerium, as the fine particles of ceramic material, with the balance being organic compounds.

The air-assisted spraying 50 is accomplished with an air-spray apparatus 80, such as that depicted schematically in FIG. 5 as previously discussed.

After the air-assisted spraying 50 is complete, the ceramic-barrier-coating mixture, now deposited on the surface 62 of the component 64, is dried, numeral 52, preferably in air at room temperature. It is usually preferred to apply several thin layers, such as three coats, of the mixture being applied in successive passes, allowing the as-applied mixture to dry between coats.

The resulting ceramic barrier coating 68 may be of any operable thickness, but is preferably quite thin. The ceramic barrier coating material is most preferably present in an amount of from about 0.0005 to about 0.0015 grams per square inch of the pre-treated component surface 62. After organic compounds or organics have been removed by firing, witness coupon target weight additions are about 0.0005 to about 0.0015 grams per square inch.

This completes the optional pre-treatment 42. It is preferred to use the polishing 44 to remove pre-existing contaminants from the surface 62. It is preferred to use the pre-oxidation 46 to provide a uniformly oxidized surface for the application of the coatings. It is preferred to deposit the ceramic barrier coating 68 to provide a wettable surface for the application of the reflective-coating mixture, to prevent interdiffusion of the subsequently applied reflective coating with the base metal of the component 64, and to provide temperature stability for the reflective-barrier coating.

A reflective-coating mixture is thereafter air sprayed, numeral 54, onto the component surface 62, or, if the pre-treatment is used, the pre-treated component surface 62 or a surface 70 of the ceramic barrier coating 68 if the step 48 is used. The reflective-coating mixture comprises fine particles of a metallic pigment, such as platinum, gold, palladium, silver, rhodium, and alloys thereof, mixed with an organic reflective-coating-mixture carrier. A platinum/gold blend is preferred as the metallic pigment. As previously discussed in the FIG. 3, preferably, the reflective coating mixture is a blend of about 25 percent by weight Bright Platinum APP100A with the remaining portion being Bright Gold 991BD. Alternately, the reflective coating is composed entirely of Bright Platinum APP100A. The blended reflective coating mixture maintains the better performance across all heat rejection bands and has a bronze appearance as applied. The Bright Platinum APP100A reflective coating maintains performance at higher temperature applications and is silver in color as applied.

Alternately, glass or ceramic materials can be added as filler to either reflective coat formulation. This filler material can comprise up to about 25 percent weight of the reflective coat. Further, dispersants can also be used which reduce the surface tension of droplets within the spray stream contacting the component surface being sprayed such that more uniform coatings are achieved.

The component 64 having the reflective-coating mixture thereon is thereafter fired to form a reflective coating 72, numeral 56. The firing 56 is performed by heating the reflective-coating mixture to an elevated temperature in air. A preferred temperature range is from about 1,100° F. to about 2,150° F., and a most-preferred firing 56 is at 1,400° F. for one hour. The preferred approach is to heat the entire component 64 and the applied coating 72 (and the coating 68, where present) to the firing temperature.

Similar to the FIG. 3 process, the reflective coating 72 is applied in an amount such that the total amount of the reflective coating 72 and the ceramic barrier coating 68 (where used) are together present in an amount of from about 0.00325 to about 0.00625 grams per square inch of the component surface 62.

Figure 8:
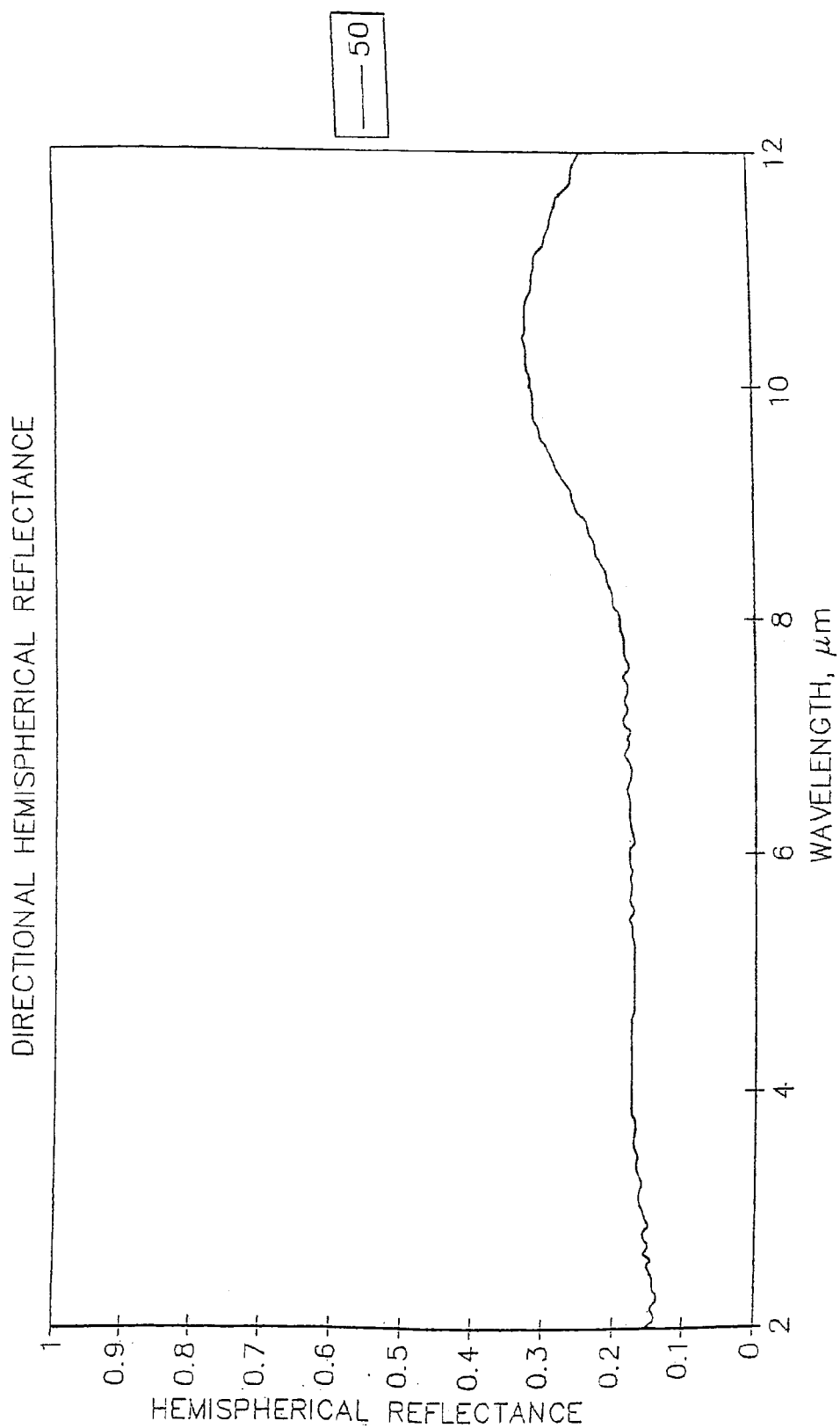
FIGS. 8-11 are graphs of hemispherical reflectance at a 50 degree reflection angle for As-received Rene 41® exposed to 1,600° F. for 50 hours (FIG. 8), As-received Rene 41® plus fired reflective coating (FIG. 9), As-received Rene 41® plus fired reflective coating and ceramic barrier coating (FIG. 10), and Polished and pre-oxidized Rene 41® plus fired reflective coating and ceramic barrier coating, after exposure to 1,600° F. for 50 hours (FIG. 11).
Figure 9:
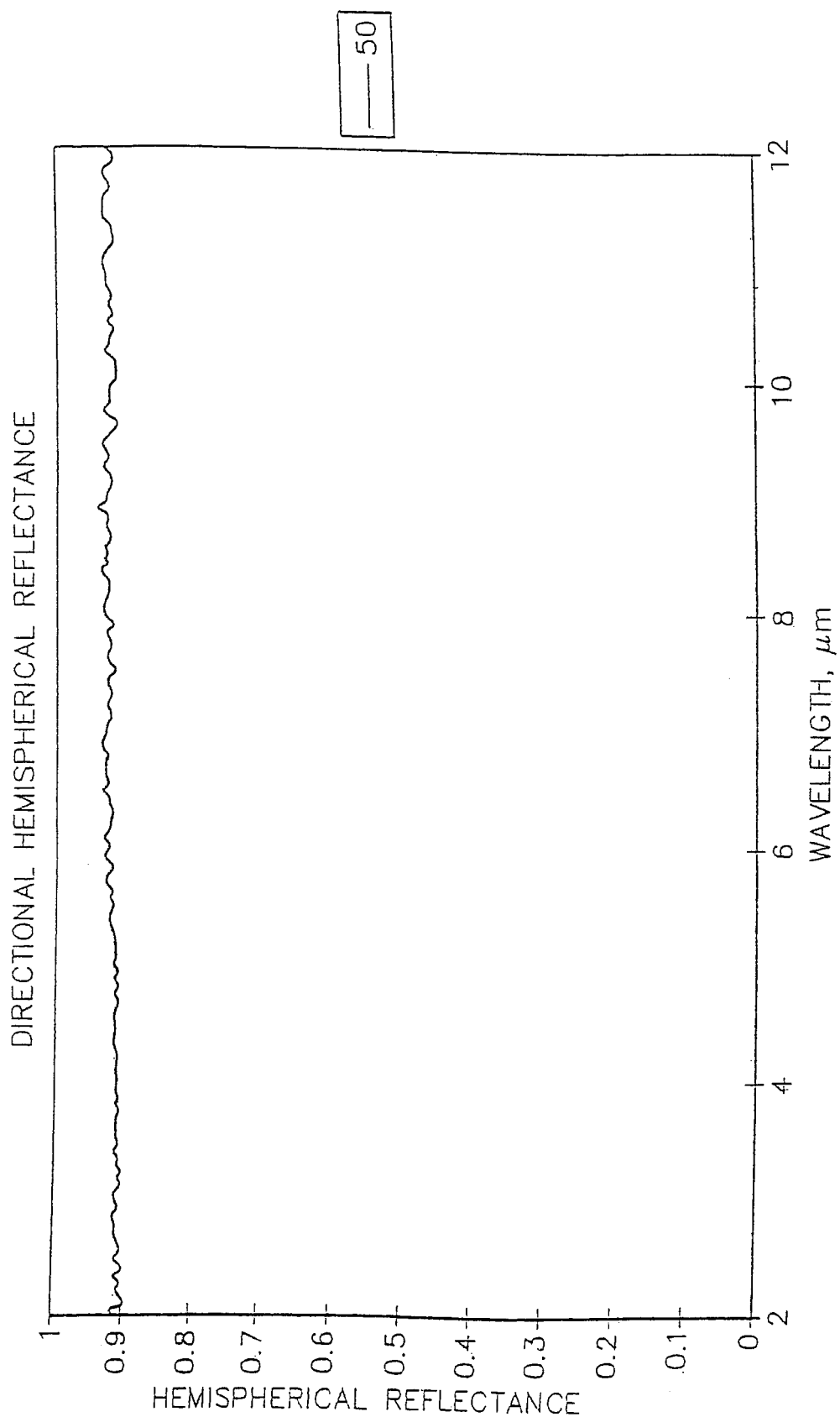
Figure 10:
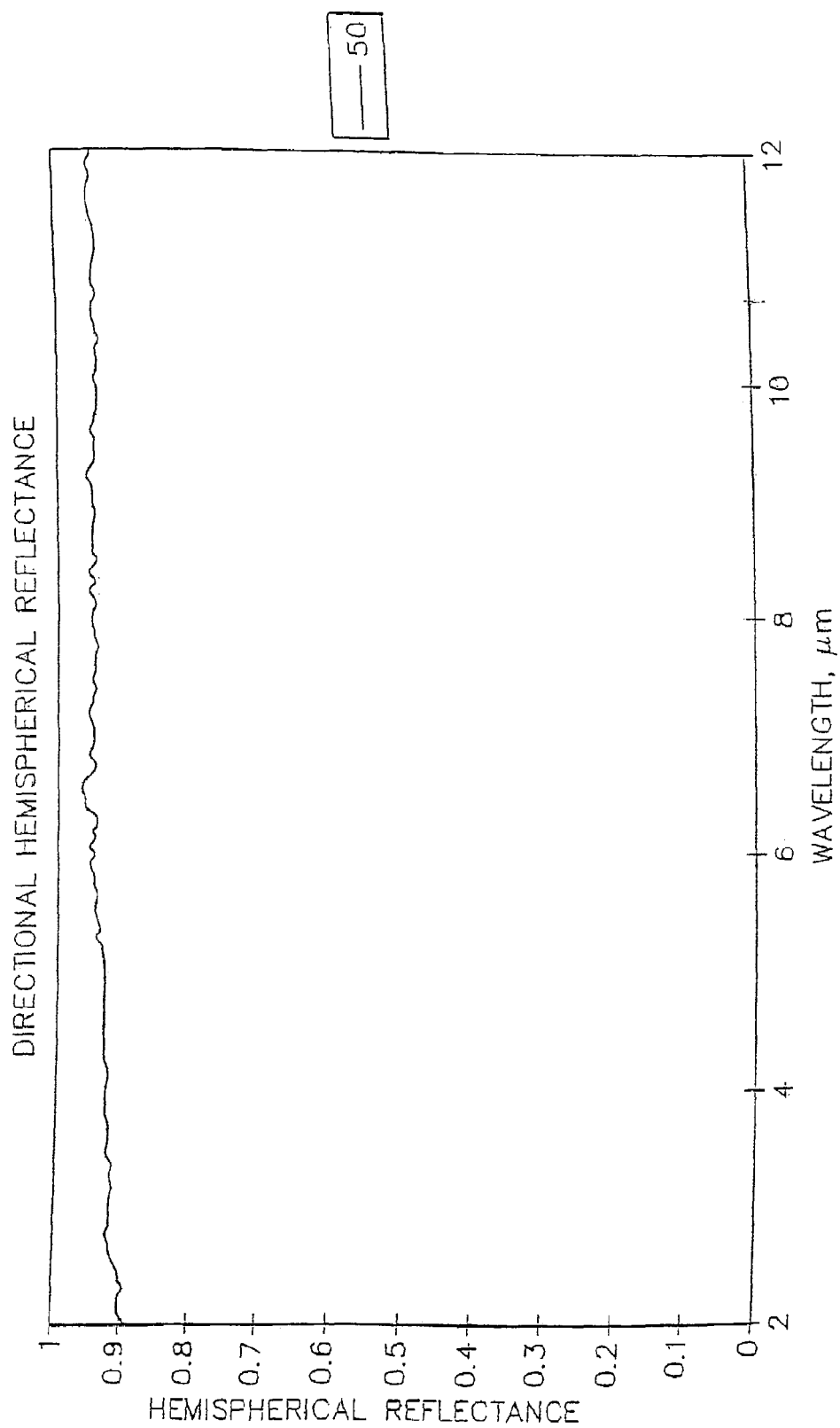
Figure 11:
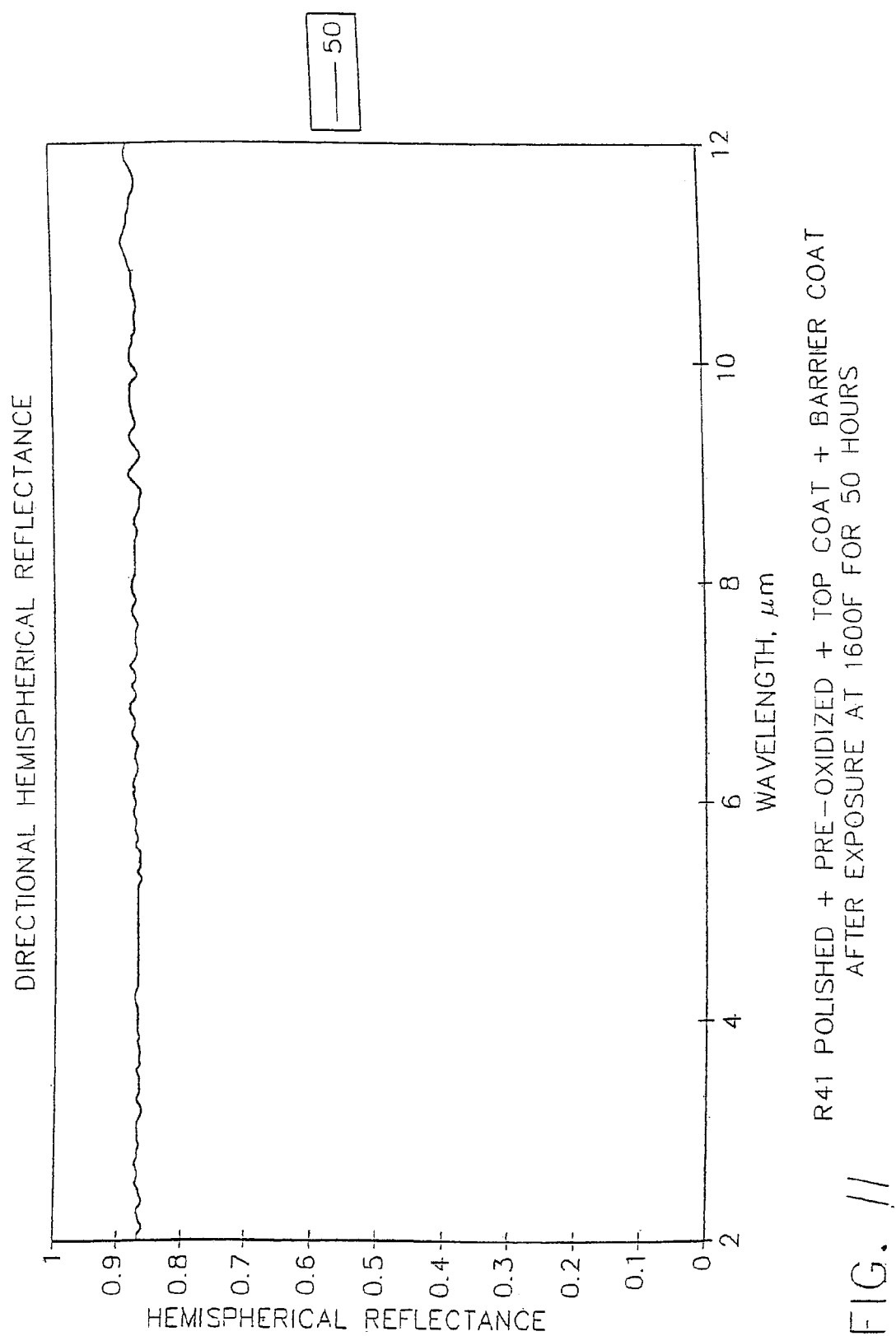

The present approach has been reduced to practice by the procedure discussed above and the performance of the coated components tested. FIGS. 8-11 present some illustrative test results for these coating components. These figures depict the hemispherical reflectance at an angle of 50 degrees as a function of wavelength in micrometers, in the infrared spectrum. As seen in FIG. 8, uncoated Rene 41® exposed to 1,600° F. for 50 hours has a low reflectance over the entire infrared spectrum. This low reflectance leads to a large heat absorption and a consequent elevated temperature. Much higher reflectance is achieved when only the reflective coating 72 is applied and fired, FIG. 9, and when both the ceramic barrier coating 68 and the reflective coating 72 are applied and fired, FIG. 10. FIG. 11 illustrates the reflective performance of the Rene 41® which has received the preferred treatment of surface polish, pre-oxidation, ceramic barrier coating 68, and reflective coating 72, and after exposure to 1,600° F. for 50 hours. A comparison of the results of FIGS. 8 and 11 shows the significant improvement in reflective performance achieved using the preferred approach, which translates into reduced temperature of the engine component during service.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of applying a heat-rejection coating, comprising the steps of:
   supplying a metallic component of a gas turbine engine selected from the group consisting of a cobalt-base superalloy, a nickel-base superalloy and a titanium alloy;
   providing a reflective-coating mixture, wherein the reflective-coating mixture comprises a metallic pigment and a reflective-coating-mixture carrier;
   applying the reflective-coating mixture to a surface of the component at ambient temperature and pressure by a method selected from the group consisting of air-assisted spraying, airless spraying, brushing, and decal transfer; and firing the component surface having the reflective-coating mixture thereon to form a reflective coating on the component.

2. The method of claim 1, wherein the step of applying the reflective-coating mixture includes the step of air-assisted spraying the reflective-coating mixture.

3. The method of claim 1, wherein the step of providing the reflective-coating mixture includes providing the reflective-coating mixture that includes metallic pigment selected from the group consisting of platinum, gold, palladium, silver, rhodium and alloys thereof.

4. The method of claim 1, wherein the step of providing the reflective-coating mixture includes providing the reflective-coating mixture that further includes an organic reflective-coating-mixture carrier.

5. The method of claim 1, wherein the step of applying the reflective-coating mixture includes the method of air-assisted spraying the reflective-coating mixture such that the reflective coating is present in an amount of from about 0.00275 to about 0.00475 grams per square inch.

6. The method of claim 1, further including an additional step before the step of applying the reflective-coating mixture, of applying a ceramic baffler coating onto the surface of the component.

7. The method of claim 6 wherein the step of applying the reflective-coating mixture includes applying the reflective-coating mixture onto the ceramic barrier coating applied to the component.

8. The method of claim 6, wherein the step of applying the ceramic barrier coating includes applying a ceramic material selected from the group consisting of lanthanum and cerium.

9. The method of claim 6, wherein the step of applying the ceramic barrier coating includes applying a ceramic-barrier-coating mixture such that the reflective coating and the ceramic barrier coating are together present in an amount of from about 0.00325 to about 0.00625 grams per square inch.

10. The method of claim 6, further including the step of drying the ceramic-barrier-coating mixture after applying the ceramic barrier coating mixture.

11. The method of claim 6 wherein the step of applying the ceramic baffler coating further includes applying the ceramic barrier coating mixture by air-assisted spraying.

12. The method of claim 1, further including an additional step before the step of applying the reflective-coating mixture, of polishing the component surface.

13. The method of claim 1, further including an additional step before the step of providing the reflective-coating mixture, of pre-oxidizing the component surface of the component.

14. The method of claim 1, further including the additional steps before the step of providing the reflective-coating mixture, of polishing the component surface of the component, and thereafter pre-oxidizing the component surface.

15. The method of claim 1, further including the additional steps before the step of applying the reflective-coating mixture, of polishing the component surface of the component, thereafter pre-oxidizing the component surface, and thereafter applying the ceramic barrier coating onto the pre-oxidized component surface.

16. The method of claim 1 wherein the step of providing the reflective-coating mixture further includes providing a mixture including a noble metal encapsulator.

17. The method of claim 1 wherein the step of providing the reflective-coating mixture further includes providing a mixture including a flux.

18. The method of claim 1 wherein the step or providing the reflective-coating mixture includes providing a mixture including a predetermined amount of filler.

19. The method of claim 18 wherein the filler is glass or ceramic materials.

20. The method of claim 18 wherein the filler comprises up to about 25 percent of the reflective-coating mixture by weight.

21. A method of applying a heat-rejection coating, comprising the steps of:

supplying a metallic component of a gas turbine engine, the component comprising a nickel-base superalloy and having a component surface;

pre-treating the component surface; thereafter air-assisted spraying a reflective-coating mixture at ambient temperature and pressure onto the pre-treated component surface, the reflective-coating mixture comprising a metallic pigment and a reflective-coating-mixture carrier; and firing the component surface having the coating mixture thereon.

22. The method of claim 21, wherein the step of pre-treating the component surface includes the step of polishing the component surface, thereafter pre-oxidizing the component surface, and thereafter applying a ceramic barrier coating onto the component surface.

23. The method of claim 22, wherein the step of applying the ceramic barrier coating includes the steps of air-assisted spraying a ceramic-baffler-coating mixture onto the component, and drying the ceramic-barrier-coating mixture.

* * * * *

UNITED STATES PATENT AND TRADEMARK OFFICE
CERTIFICATE OF CORRECTION

PATENT NO. : 7,250,192 B2 Page 1 of 1
APPLICATION NO. : 10/726361
DATED : July 31, 2007
INVENTOR(S) : Skoog et al.

It is certified that error appears in the above-identified patent and that said Letters Patent is hereby corrected as shown below:

Col. 9, Line 26, "baffler" should be -- barrier --.

Col. 9, Line 44, "baffler" should be -- barrier --.

Col. 10, Line 49, "baffler" should be -- barrier --.

Signed and Sealed this

Eighteenth Day of September, 2007

JON W. DUDAS
*Director of the United States Patent and Trademark Office*